US008326349B2

(12) United States Patent
Brown et al.

(10) Patent No.: US 8,326,349 B2
(45) Date of Patent: Dec. 4, 2012

(54) MULTI-SERVICE CELLULAR PHONE NETWORK ACCESS DEVICE

(75) Inventors: David Brown, Abbotsley (GB); Ajit B. Pendse, Durham, NC (US)

(73) Assignee: Maxim Integrated Products, Inc., San Jose, CA (US)

( * ) Notice: Subject to any disclaimer, the term of this patent is extended or adjusted under 35 U.S.C. 154(b) by 796 days.

(21) Appl. No.: 12/042,655

(22) Filed: Mar. 5, 2008

(65) Prior Publication Data

US 2008/0220813 A1 Sep. 11, 2008

Related U.S. Application Data

(60) Provisional application No. 60/893,536, filed on Mar. 7, 2007.

(51) Int. Cl.
*H04M 1/00* (2006.01)
(52) U.S. Cl. ..................................... 455/552.1
(58) Field of Classification Search .................. 455/445, 455/404.1, 423, 448, 512; 370/338, 445
See application file for complete search history.

(56) References Cited

U.S. PATENT DOCUMENTS

| | | | | |
|---|---|---|---|---|
| 7,395,045 B2* | 7/2008 | Jijina et al. | ................. | 455/404.1 |
| 7,395,068 B2* | 7/2008 | Sylvain | ......................... | 455/445 |
| 7,424,008 B2* | 9/2008 | Thermond | ..................... | 370/352 |
| 2006/0079219 A1* | 4/2006 | Nicolini | ......................... | 455/423 |
| 2007/0098009 A1* | 5/2007 | Du et al. | ....................... | 370/445 |
| 2008/0159245 A1* | 7/2008 | Benn et al. | .................... | 370/338 |
| 2010/0220697 A1* | 9/2010 | Liu et al. | ....................... | 370/338 |

FOREIGN PATENT DOCUMENTS

| | | |
|---|---|---|
| KR | 10-2004-0083851 A | 10/2004 |
| KR | 10-2006-0063620 A | 10/2004 |
| KR | 10-2006-0114482 A | 11/2006 |

OTHER PUBLICATIONS

Patent Cooperation Treaty, International Search Report and Written Opinion of the International Searching Authority, Jul. 20, 2008, 7 Pages.

* cited by examiner

*Primary Examiner* — Michael Faragalla
(74) *Attorney, Agent, or Firm* — North Weber & Baugh LLP

(57) ABSTRACT

An access device is described herein for determining and selecting, for a cellular call received by a cellular transceiver of the access device, one of a plurality of networks to route the call to. In some embodiments, the determining and selecting may be based at least on a type of each of a plurality of network interfaces of the access device and availability of each corresponding network, the network interfaces including at least two of a cellular retransmitter, an IP networking interface, or a PSTN interface. In various embodiments, if a cellular network is determined and selected, the access device may relay the call. Also, if an IP or PSTN network is determined and selected, the access device may establish on behalf of the call an outgoing call through the IP or PSTN network and translate signals of the cellular call to signals for the IP or PSTN network.

22 Claims, 2 Drawing Sheets

MULTI-SERVICE CELLULAR PHONE NETWORK ACCESS DEVICE

RELATED APPLICATIONS

The present application claims priority to U.S. Provisional Application 60/893,536, entitled "Multi-Service Cellular Phone Network Access Device," filed on Mar. 7, 2007. The specification of the 60/893,536 provisional application is hereby incorporated by reference in its entirety for all purposes, except for those sections, if any, that are inconsistent with this specification.

TECHNICAL FIELD

The present invention relates generally to the fields of cellular and network communication. More particularly, the present invention relates to a multi-service cellular network access device providing access to at least two of a cellular network, an Internet Protocol (IP) network, and a Public Switching Telephone Network (PSTN).

BACKGROUND

Previous residential or enterprise cellular access devices have tended to be one of two types:
  Cellular retransmitter/booster, and
  Femtocell
In a Cellular retransmitter, the RF signal from the cellular handset is received at the repeater, where it is boosted and typically relayed to the Cellular Operator (CellOp) tower using a more powerful antenna. This provides in-house cellular coverage in areas where the signal indoors would otherwise be weak. The cellular handset does not register with the repeater—it is operating purely by amplifying the RF signal.

In a femtocell, the cellular handset registers with the femtocell as it would with a base-station in a cellular network. The femtocell then encapsulates data and signaling exchanged with the handset into IP packets, and transmits to the CellOp using the Internet. All calls established using the femtocell are routed over the CellOp's network, and the femtocell is remotely managed by the CellOp.

While both approaches offer a high-quality cellular signal within the building, they both suffer from the following disadvantages:
  Calls can only be established or received using the CellOp network that the cellular handset is registered with,
  In the case of the repeater, no additional services can be offered to the user,
  In the case of the femtocell, the cellular handset is effectively connected to the CellOp's network (albeit over an IP backhaul), and the femtocell is only associated with a single CellOp,
  Neither approach allows calls to be placed from the standard cellular handset using an Internet Protocol Service Provider (IPSP) for improved quality or toll avoidance, and
  Neither approach allows the user of the cellular handset to gain access to other next generation IP-based services such as Presence, Instant Messaging or using other services such as those offered by IPSPs (e.g. Yahoo!, Skype or Google).

The present industry trend is to address some the above disadvantages via a multi-service handset, e.g. a handset capable of handling cellar and voice over IP (VOIP) calls.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for determining and selecting, by an access device, for a cellular call received by a cellular transceiver of the access device, one of a plurality of networks to route the call to. In some embodiments, the determining and selecting may be based at least on a type of each of a plurality of network interfaces of the access device and availability of each corresponding network, the network interfaces including at least two of a cellular retransmitter, an IP networking interface, or a PSTN interface. In various embodiments, if a cellular network is determined and selected, the access device may relay the call. Also, if an IP or PSTN network is determined and selected, the access device may establish on behalf of the call an outgoing call through the IP or PSTN network and translate signals of the cellular call to signals for the IP or PSTN network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
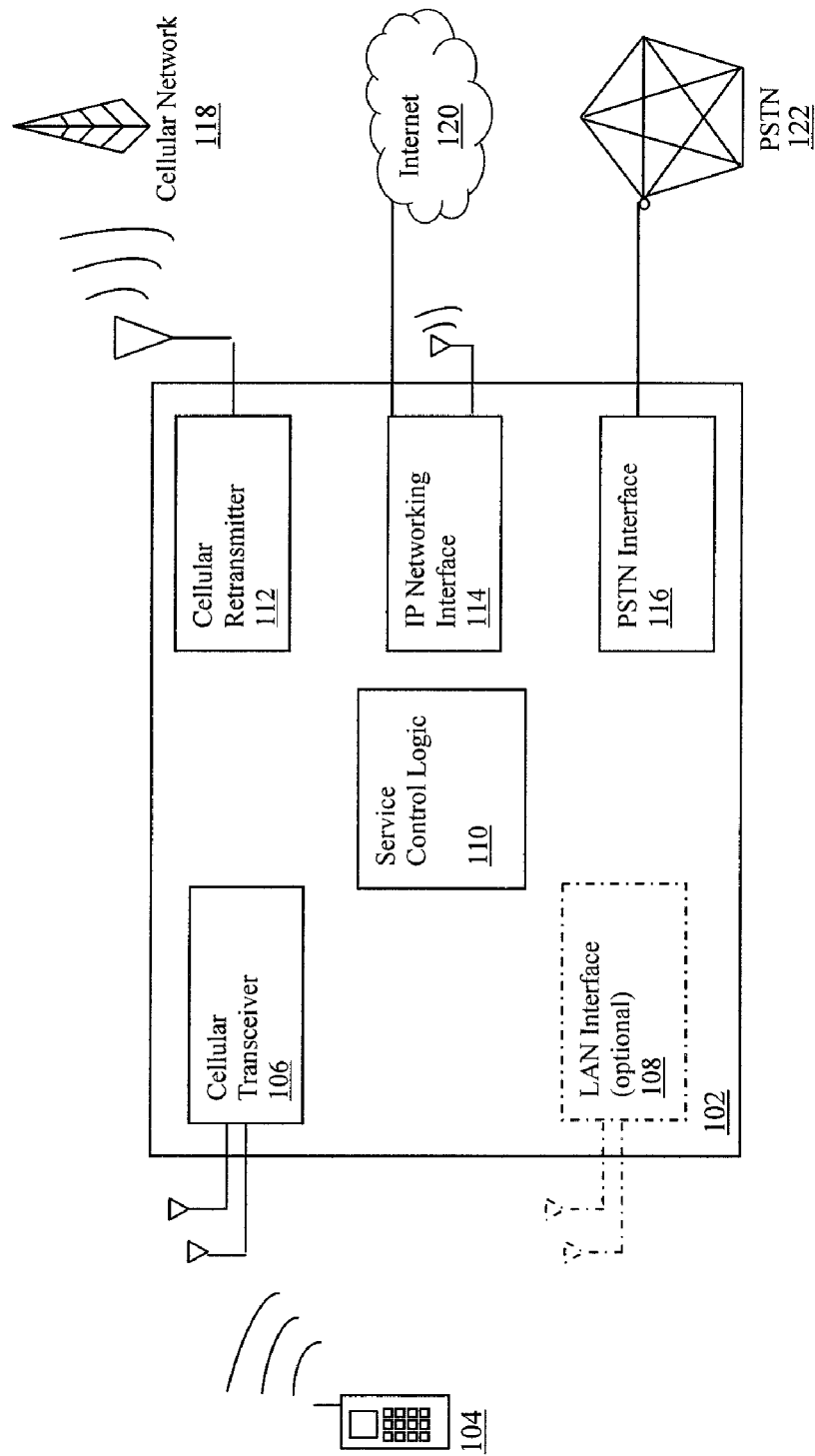
FIG. 1 illustrates an overview showing the components of an access device and the external networks and devices the access device is connected to, in accordance with various embodiments of the present invention.

FIG. 1 illustrates an overview showing the components of an access device and the external networks and devices the access device is connected to, in accordance with various embodiments of the present invention. As illustrated, an access device 102 may include a cellular transceiver 106 to enable communication with a cellular handset 104 that is proximally located from the access device 102. In one embodiment, the access device 102 may also have a wired or wireless local area network (LAN) interface 108 to enable data communication with handset 104 or with a device associated with handset 104, such as a Bluetooth or other headset. After receiving a call through the cellular transceiver 106 or LAN interface 108, the access device may determine and select one of a plurality of networks to route the received call to. Such a determination and selection may be made by service control logic 110 of access device 102. The access device 102 may e.g., route the call to a cellular network 118, an Internet Protocol (IP) network 120, or a packet switching telephone network (PSTN) 122. To allow routing to some or all of networks 118-122, access device 102 may also include a plurality of corresponding networking interfaces, e.g., a cellular retransmitter 112, an IP networking interface 114, or a PSTN interface 116. The service control logic 110 may determine and select a network 118-122 based at least on a type of each of the plurality of network interfaces 112-116 of the access device and on availability of each corresponding network 118-122. In various embodiments, the determination and selection may be based on other criteria, e.g. quality of services of a network at the time. For the embodiments where an IP network interface 110 is included and the service control logic 110 is adapted to be able to select the IP network, the service control logic 110 may also be adapted to pre-store the corresponding address for a callee telephone number, for making a VOIP call. If the cellular network 118 is selected, the service control logic 110 may relay the call through repeater 112. If the IP or PSTN network 120/122 is selected, the service control logic 110 may establish an outgoing call on behalf of the received call, and may translate the cellular signals to signals of the IP or PSTN network 120/122.

In various embodiments, access device 102 may be any sort of computing, calling routing device known in the art, with the exception of the cellular transceiver 106, LAN interface 108, service control logic 110, cellular retransmitter 112, IP networking interface 114, and PSTN interface 116. In addition to illustrated components 106-116, access device 102 may also include a number of other components that are well known in the art, such as a processor, system memory, permanent storage, other types of communication interfaces, input/output devices, and a system bus to couple the components of access device 102. Service control logic 110 of access device 102 may be operated by such a processor and stored on one or both of system memory or permanent storage. In various embodiments, the instructions implementing service control logic 110 may be stored on a storage medium, such as a compact disc, and provided to access device 102 via one of the input/output devices, such as a compact disc drive.

In some embodiments, the access device 102 can be considered as having two sides—the "local" side interface to the user's cellular handset 104 (i.e. low power cellular transceiver 106 and/or LAN interface 108) and "network" side interfaces to one of the available network services (i.e. cellular network 118 through repeater 112, IP network 120 through IP networking interface 114 or PSTN 122 through PSTN interface 116). While only these interfaces of access device 102 are described, embodiments of the invention may be practiced with more or less of these interfaces.

In one embodiment, one or more of the network interfaces 112-116 can be removed from the access device 102. For example, the cellular retransmitter 112 can be removed. In such an embodiment, this may require the cellular handset 104 to register with the access device (such registration may not be necessary if repeater 112 is used, as registration may then be with a cellular operator tower of the cellular network 118). All calls may then be routed using an IP service provider of an IP network 120 or using the PSTN 122. In another embodiment, the cellular retransmitter 112 and IP networking interface 114 can be removed, forcing all calls to be routed over the PSTN interface 116.

In various embodiments, the access device 102 may be portable. A portable access device 102 may be either a small access device 102 that can be used in a hotel room and connected to a hotel in-room broadband service, or may be a software implementation of the access device 102 functionality running on a laptop PC with a plug-in (dongle) that provides the local cellular interface (acts as the cellular transceiver 106/LAN interface 108). In both cases, the local cellular interface may run at very low power to ensure that the cellular signal does not leak excessively from the room the portable access device 102 is operating in.

As is further shown and as mentioned above, access device 102 may receive a cellular call to a callee from a proximally located cellular handset 104. Cellular handset 104 may be any sort of cellular handset known in the art, such as a mobile cellular phone, a personal digital assistant, or a media player, among others. Such a cellular handset 104 may be paired with a headset, such as a Bluetooth or other headset, to enable hands-free communication. A user may place a call using the handset 104 or its associated headset, and the call may be received by access device 102 through cellular transceiver 106 or through LAN interface 108, in the manner known in the art. In another embodiment, cellular handset 104 may be a PC having wired, wireless, or cellular capabilities. In such an embodiment, the call received by access device 102 may be a voice over IP (VoIP) call.

In some embodiments, by using connectivity and basic features available in cellular handsets 104 the access device 102 may be compatible with a wide range of current generation cellular handsets 104. Further advanced operation can be enabled in the cellular handset 104 by using logic, such as a Java Applet (or similar), executing on the cellular handset 104, and accessing access device 102 over an available cellular data interface (such as GPRS or HSDPA). The Java Applet might enable features such as Instant Messaging, file transfer or other IP-based services.

In various embodiments, on the "local side" the access device 102 may have a cellular transceiver 106, which may be any low power cellular transceiver known in the art. The low power cellular transceiver 106 may be configured to maintain a connection between the access device 102 and the cellular handset 104. The reach of such a cellular transceiver 106 may be limited to within the building the access device 102 is located in. Also, access device 102 may optionally have a wireless LAN interface 108 (e.g. a WiFi, Bluetooth or DECT transceiver) or a wired LAN interface 108 (e.g. Ethernet or USB). The wireless (WiFi) LAN interface 108 may be configured to enable the use of any handsets 104 or other devices with a compatible wireless (WiFi) interface to establish communications using any of the services available on the access device 102. For example, interface 108 may enable the use of wireless (WiFi) enabled endpoint devices (such as laptop computers, WiFi phones or dual mode (cellular+wifi phones)) to use the access device 102. In various embodiments, the wireless (WiFi) interface 108 may be disabled.

As illustrated, on the "network side", access device 102 may have a cellular retransmitter 112, which may be any sort of cellular retransmitter known in the art. The cellular retransmitter 112 may be configured to relay the cellular signal, if required, to an existing cellular network 118 through, for example, a cellular operator tower of the cellular network 118. This may enable a handset 104 registered with the access device 102 to establish calls using any existing cellular network 118 that can be reached using the repeater 112. Also, access device 102 may have an IP networking interface 114, which may be any sort of IP networking interface known in the art, such as an Ethernet or a WiMax interface, among others. The IP networking interface 114 may be configured to provide a connection between the access device 102 and the Internet 120 or some other IP network 120, enabling communication using an IP service provider or other IP based communications mechanism. Further, access device may include PSTN interface 116, which may be any PSTN interface known in the art, to enable communication with PSTN network 122. The PSTN interface 116 may be configured to provide a fall-back connection to the PSTN 122 for basic voice calling or access to emergency services (e911). As mentioned above, access device 102 may have any two or more of these network interfaces 112-116.

Cellular network 118, IP network 120, and PSTN 122 may be any cellular network, IP network, and PSTN known in the art. No modification of cellular network 118, IP network 120, and PSTN 122 may be required to interoperated with access device 102.

As illustrated and as described above, access device 102 may comprise service control logic 110. Service control logic 110 may be adapted to manage local interfaces 106-108 and network interfaces 112-116, in some embodiments. The service control logic 110 may include a router function for routing a call between the local and network side interfaces. In various embodiments, service control logic 110 may further manage access control to the access device 102—enabling only handsets 104 registered with the access device 102 to use the access device 102. Service control logic 110 may determine and select a network 118-122 to route a call to based on network interface types, network availability, network preferences, user preferences (customized to an individual user), current network service quality, and/or based on a least cost routing decision, in some embodiments. Service control logic 110 may be adapted to store corresponding IP addresses for various telephone numbers for making VOIP calls, or dynamically obtain the IP addresses from a directory (or the cellular handset). Upon selecting the network 118-122, service control logic 110 may enable access device 102 to service as a voice gateway between cellular handset 104 and supported communications services. Additionally, service control logic 110 may run required client software for the communications services offered by the access device 102 (e.g. embedded GoogleTalk client, SIP UA, Skype client, etc.).

In some embodiments, service control logic 110 may enable the end users of cellular handsets 104 to register with the access device once the handsets 104 comes within range of the cellular transceiver 106. Service control logic 110 may only permit handsets 104 which had previously been authorized to use the access device 102 to communicate with it. In other embodiments, service logic 110 may only require registration upon receiving a cellular call, and may facilitate the handset 104 in registering, either with access device 102, with a service, or with both.

In various embodiments, upon receipt of a cellular call by access device 102, service control logic 110 may intercept the outgoing signal, and makes a decision based on available networks, types of network interfaces possessed by access device 102 and other factors, such as cost, quality and so forth, to route the outgoing call. In one embodiment, service control logic 110 may prefer the cellular network 118 to the IP network 120 or PSTN 122, selecting the IP network 120 only after connection to the cellular network 118 via the repeater 112 has failed, and selecting the PSTN 122 only if neither the cellular network 118 nor the IP network 120 are available. In one embodiment, the PSTN 122 may be used as a fallback network for emergency calling. In other embodiments, other arrangements of preference may be used. In addition to or instead of preference, service control logic 110 may determine and select a network based on a least cost routing decision, as mentioned above. Through use of such a mechanism, the lowest cost communication service for each outing call will be selected and used. In various embodiments, access device 102 may communicate its selection back to the user of the cellular handset 104, and accord the user an opportunity to override the access device.

In some embodiments, if cellular network 118 is determined and selected by service control logic 110, the access device 102 may relay the cellular call to the cellular network 118 using the cellular retransmitter 112. The cellular retransmitter 112 may retransmit the cellular signal from the handset 104 to an available CellOp tower of cellular network 118. Service control logic 110 may accomplish this by relays all data between the handset 104 and the repeater 112, which in turn transmits the signals to the tower. The service control logic 110 may also verify that the handset 104 is registered with the CellOp tower, enabling the handset 104 to originate and receive calls from the CellOp. In one embodiment, the cellular handset 104 may remain registered with the external CellOp tower through the operation of the cellular retransmitter 112.

In other embodiments, if the IP network 120 or PSTN 122 is determined and selected by service control logic 110, the service control logic 110 may establish, on behalf of the cellular call, an outgoing call to the callee through the IP network 120 or PSTN 122. Once a connection is establishing, service control logic 110 may facilitate the access device 102 in acting as a gateway and may translate the audio signals from the handset 104 to signals of the desired service or PSTN. Also, if the IP network 120 or the PSTN 122 is to be used, the cellular signal from the handset may be intercepted and not relayed to the CellOp tower. Instead, service control logic 110 may simulate the signal from the handset 104 to maintain connection with the CellOp tower, and establish the outgoing call, as mentioned above. Further, if the IP network 120 is selected, the service control logic 110 may require the handset 104 to register directly with the access device 102. In such an embodiment, the handset 104 may not be able to use the cellular retransmitter 112 and calls may only be possible using the other network services (i.e. IP or PSTN).

In some embodiments, service control logic 110 may identify the handset 104 to determine which of the user has come into range. To facilitate the identifying, access device 102 may maintain a profile for cellular handset 104 from which the cellular call was received, including service providers used by the cellular handset. If an IP service provider or other IP service has been associated with that user, then service control logic 110 may establish communications with the IP service provider. On registration with the IP service provider, the user's presence (where supported by the IP service provider) may be set to indicate the location and online status of the user. This process may be repeated for all configured IP service provider services for a particular user.

In various embodiments, service control logic 110 may also handle incoming calls received from one of the network interfaces 112-116 and directed to handset 104. If a call is received via repeater 112 from the cellular network 118, the service control logic 110 may simply relay the call to the handset 104. Incoming calls from the PSTN 122 or IP network 120 may be identified by service control logic 110, which may in turn intercept the signal from the CellOp tower and indicate to the handset 104 that there is a new incoming call to the handset 104. On answering the call at the handset 104 the service control logic 110 may act as gateway and translate the audio from the handset 104 to the desired service or PSTN. While the call is active, if an incoming call is received from the CellOp, the handset 104 may either be informed (in the event that call waiting is supported) or the service control logic 110 may ignore the incoming request, and the originator of the call will typically be informed by the CellOp that the handset 104 they are trying to reach is unavailable or be invited by the CellOp to leave a voice mail.

In additional embodiments, the access device 102 can use the existing handset 104 capabilities to offer additional services. These may include:
  Intercept of Short Message Service (SMS), Multimedia Message Service (MMS) or other messages sent from the handset 104 and their onward transmission using a configured IP Instant Messaging (IM) service;
  Relay of received IM messages to the handset 104 as SMS or MMS messages; and
  Access to high speed internet services on the handset 104 over General Packet Radio Service (GPRS), High Speed Downlink Packet Access (HSDPA), etc. accessed by routing data directly from the Internet 120 (accessed using the IP networking interface 114) to the handset 104.

In various embodiments, the access device 102 may be configured to support multiple simultaneous users. The number of users may be restricted only by the capabilities of each of the interfaces, or the processing power available to execute the service control logic 110. When multiple users are connected to the access device 102, the access device 102 has the capability to act as a Private Branch Exchange (PBX) and offer services such as direct dialing using a short number between handsets 104 registered with the access device 102. Further, multiple access device 102s can be interconnected using a secure link (such as an IP tunnel over the Internet 120 accessed using the IP networking interface 114) between access device 102s to offer distributed access device 102 peer-to-peer communications. In this configuration, short number dialing between access device 102s may be possible.

Figure 2:
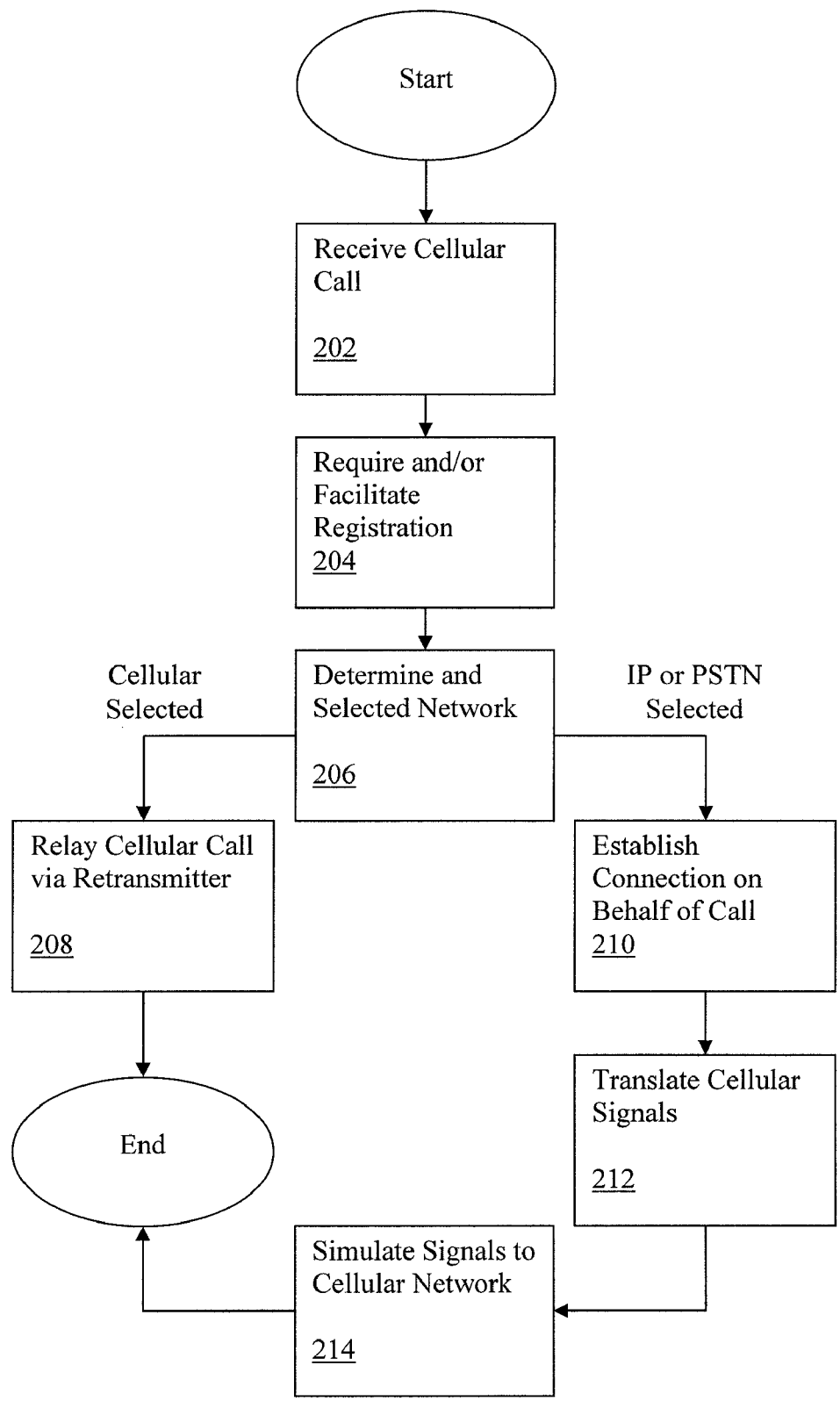
FIG. 2 illustrates a flow chart view of selected operations of the methods of various embodiments of the present invention.

FIG. 2 illustrates a flow chart view of selected operations of the methods of various embodiments of the present invention. As illustrated, an access device having a cellular transceiver and a plurality of network interfaces, the network interfaces including at least two of a cellular retransmitter, an IP networking interface, or a PSTN interface, may receive a cellular call from a cellular handset proximally located from the access device, block 202. The cellular call may be to a callee and may be received by the cellular transceiver of the access device. Also, the receiving may comprise receiving the call by a wireless or wired local area network interface of the access device rather than by the cellular transceiver. In one embodiment, the access device may require the cellular handset initiating the cellular call to be registered, and, if the cellular handset is not registered, facilitating registering of the cellular handset, block 204. The access device may then determine and select one of a plurality of networks to route the cellular call to, the determining and selecting being based at least on a type of each of the plurality of network interfaces of the access device, availability of each corresponding network and/or other additional factors, block 206. In various embodiments, the determining and selecting may comprise determining a lowest cost communication service and selecting the one of the plurality of networks corresponding to the lowest cost communication service. In other embodiments, the determining and selecting may include preferring the cellular network to the IP network, and selecting the IP network only after connection to the cellular network via the repeater has failed. In yet other embodiments, the access device may use the PSTN network as a fallback network for emergency calling. In still other embodiments, the access device may allow a user of the cellular handset to override its network selection.

As is shown, if a cellular network is determined and selected, the access device may relay the cellular call to the cellular network using the cellular retransmitter, block 208. In one embodiment, the relaying may comprise relaying the cellular call to a cellular operator tower of the cellular network.

In various embodiments, if an IP or PSTN network is determined and selected, the access device may establish, on behalf of the cellular call, an outgoing call to the callee through the IP or PSTN network, block 210. Upon establishing the outgoing call, the access device may translate signals of the cellular call to signals for the IP or PSTN network, block 212. In one embodiment, the access device may maintain a profile for a cellular handset from which the cellular call was received, including service providers used by the cellular handset, and, when a call is received from the cellular handset, may establish a connection to the IP network via one of the service providers. Also, if the IP or PSTN network is determined and selected, the access device may simulate a signal to the cellular network to maintain a connection to the cellular network, block 214.

In some embodiments, the access device may perform the determining, selecting, relaying, establishing, and/or said translating simultaneously for multiple cellular handsets.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:
1. A method comprising:
  determining and selecting, by an access device, for a cellular call to a callee received by a cellular transceiver of the access device, one of a plurality of networks to route the cellular call to, the determining and selecting being based at least on a type of each of a plurality of network interfaces of the access device and availability of each corresponding network, the network interfaces including at least two of a cellular retransmitter, an IP networking interface, or a PSTN interface, wherein the access device is a standalone device coupled between a cellular handset and the plurality of networks, and wherein the access device is coupled to each of the cellular handset and the plurality of networks wirelessly or by a wire;
  when a cellular network, coupled wirelessly to the access device, is determined and selected, relaying, by the access device, the cellular call using the cellular retransmitter;
  and when an IP or PSTN network, coupled to the access device wirelessly or by a wire, is determined and selected,
  establishing on behalf of the cellular call, by the access device, an outgoing call to the callee through the IP or PSTN network respectively, and translating, by the access device, signals of the cellular call to signals for the IP or PSTN network respectively.

2. The method of claim 1, further comprising receiving, by the access device, the cellular call from the cellular handset proximally located from the access device.

3. The method of claim 2, wherein said receiving comprises receiving the call by a wireless or wired local area network interface of the access device rather than by the cellular transceiver.

4. The method of claim 1, wherein the relaying comprises relaying the cellular call to a cellular operator tower of the cellular network.

5. The method of claim 1, wherein the PSTN network is used as a fallback network for emergency calling.

6. The method of claim 1, further comprising requiring the cellular handset initiating the cellular call to be registered, and, if the cellular handset is not registered, facilitating registering of the cellular handset.

7. The method of claim 1, wherein the determining and selecting comprise determining a lowest cost communication service and selecting the one of the plurality of networks corresponding to the lowest cost communication service.

8. The method of claim 1, wherein the determining and selecting include preferring the cellular network to the IP network, and selecting the IP network only after connection to the cellular network via the repeater has failed.

9. The method of claim 1, further comprising maintaining a profile for the cellular handset from which the cellular call was received, including service providers used by the cellular handset, and, when a call is received from the cellular handset, establishing a connection to the IP network via one of the service providers.

10. The method of claim 1, wherein said determining, said selecting, said relaying, said establishing, and/or said translating are performed simultaneously by the access device for multiple cellular handsets.

11. The method of claim 1, further comprising, if the IP or PSTN network is determined and selected, simulating a signal to the cellular network to maintain a connection to the cellular network.

12. An access device that is coupled between a cellular handset and a plurality of networks, comprising:
a cellular transceiver configured to facilitate cellular communication wirelessly with the cellular handset proximally located from the access device;
the plurality of network interfaces, including at least two of a cellular retransmitter, an IP networking interface, or a PSTN interface to couple the access device to one or more networks, wherein the plurality of network interfaces couple the access device to the one or more networks wirelessly or by a wire; and
service control logic coupled to the cellular transceiver and the one or more interfaces to, when operated,
determine and select, for a cellular call from the cellular handset to a callee received by the cellular transceiver, one of a plurality of networks to route the cellular call to through a corresponding one of the plurality of network interfaces, the determining and selecting being based at least on a type of each of the plurality of network interfaces and availability of each corresponding network,
when a cellular network, coupled wirelessly to the access device, is determined and selected, relay the cellular call using the cellular retransmitter, and
when an IP or PSTN network, coupled to the access device wirelessly or by a wire, is determined and selected, (1) establish on behalf of the cellular call an outgoing call to the callee through the IP or PSTN network respectively, and (2) translate signals of the cellular call to signals for the IP or PSTN network respectively.

13. The access device of claim 12, wherein the service control logic is further adapted to receive the cellular call.

14. The access device of claim 12, wherein the service control logic is adapted to determine and select, and said determine and select further comprise determining a lowest cost communication service and selecting the one of the plurality of networks corresponding to the lowest cost communication service.

15. The access device of claim 12, wherein the service control logic is adapted to determine and select, said determine and select further including preferring the cellular network to the IP network, and selecting the IP network only after connection to the cellular network via the repeater has failed.

16. The access device of claim 12, wherein said determine, said select, said relay, said establish, and/or said translate are performed simultaneously by the access device for multiple cellular handsets.

17. The access device of claim 12, wherein the service control logic is further adapted to, if the IP or PSTN network is determined and selected, simulate a signal to the cellular network to maintain a connection to the cellular network.

18. The access device of claim 12, further comprising a wireless or wired local area network interface coupled to the service control logic to receive calls from the cellular handset or another device associated with the cellular handset.

19. An article of manufacture comprising:
a storage medium;
a plurality of instructions stored on the storage medium and configured to program an access device that is a standalone device coupled between a cellular handset and a plurality of networks to
determine and select, for a cellular call to a callee received by the cellular transceiver of the access device, one of the plurality of networks to route the cellular call to, the determining and selecting being based at least on a type of each of a plurality of network interfaces of the access device and availability of each corresponding network, the network interfaces including at least two of a cellular retransmitter, an IP networking interface, or a PSTN interface,
when a cellular network, coupled to the access device wirelessly, is determined and selected, relay the cellular call using the cellular retransmitter, and
when an IP or PSTN network, coupled to the access device wirelessly or by a wire, is determined and selected, establish on behalf of the cellular call an outgoing call to the callee through the IP or PSTN network respectively, and
translate signals of the cellular call to signals for the IP or PSTN network respectively; and
wherein the access device is coupled to each of the cellular handset and the plurality of networks wirelessly or by a wire.

20. The article of claim 19, wherein the instructions are further configured to program the access device to receive the cellular call from the cellular handset proximally located from the access device.

21. The article of claim 19, wherein instructions are configured to determine and select, and said determine and select include preferring the cellular network to the IP network, and selecting the IP network only after connection to the cellular network via the repeater has failed.

22. The article of claim 19, wherein the instructions are further configured to, if the IP or PSTN network is determined and selected, simulate a signal to the cellular network to maintain a connection to the cellular network.

* * * * *